US006983169B2

(12) United States Patent
Vogel et al.

(10) Patent No.: US 6,983,169 B2
(45) Date of Patent: Jan. 3, 2006

(54) WIRELESS DEVICE ALLOWING FOR CONFIGURATION OF SETTINGS AND METHOD THEREFOR

(75) Inventors: David Richard Vogel, Boynton Beach, FL (US); Adam Mark Will, Boynton Beach, FL (US); Henry Wandt, Miami Beach, FL (US); Lucas Solessi, Buenos Aires (AR)

(73) Assignee: Motorola, Inc., Schaumburg, IL (US)

( * ) Notice: Subject to any disclaimer, the term of this patent is extended or adjusted under 35 U.S.C. 154(b) by 164 days.

(21) Appl. No.: 10/388,774

(22) Filed: Mar. 14, 2003

(65) Prior Publication Data
US 2004/0180649 A1 Sep. 16, 2004

(51) Int. Cl.
*H04M 1/00* (2006.01)
(52) U.S. Cl. .............................. 455/550.1; 455/575.6; 455/41.2; 455/90.3
(58) Field of Classification Search ............. 455/550.1, 455/575.2, 344, 90.3, 41.2, 569.1, 552.1, 455/556.1–556, 575.1, 575.6, 557; 340/539.23, 340/593, 539.1
See application file for complete search history.

(56) References Cited

U.S. PATENT DOCUMENTS

| 5,542,105 A | * | 7/1996 | Finch et al. ............. 455/575.1 |
| 5,884,156 A | * | 3/1999 | Gordon .................... 455/552.1 |
| 6,021,310 A | * | 2/2000 | Thorne ..................... 455/556.1 |
| 6,021,332 A | * | 2/2000 | Alberth et al. ........... 455/552.1 |
| 6,115,620 A | * | 9/2000 | Colonna et al. .......... 455/569.1 |
| 6,397,085 B1 | * | 5/2002 | Okagaki et al. ............ 455/567 |
| 6,449,492 B1 | * | 9/2002 | Kenagy et al. .......... 455/550.1 |
| 6,643,528 B1 | | 11/2003 | Shim et al. |
| 2002/0107009 A1 | * | 8/2002 | Kraft et al. ................. 455/417 |
| 2003/0153355 A1 | * | 8/2003 | Warren ....................... 455/557 |
| 2004/0070499 A1 | * | 4/2004 | Sawinski ................. 340/568.1 |
| 2004/0110544 A1 | * | 6/2004 | Oyagi et al. ............. 455/575.1 |

* cited by examiner

*Primary Examiner*—Joseph Feild
*Assistant Examiner*—Kamran Afshar
(74) *Attorney, Agent, or Firm*—Fleit, Kain, Gibbons, Gutman, Bongini & Bianco, P.L.; Randi L. Karpinia

(57) ABSTRACT

Disclosed is a system, method and computer readable medium for configuring settings of a wireless device. The system on a wireless device includes means for detecting a user action indicating a particular mode for the wireless device. The means for detecting includes any one of means for detecting the proximity of a holster for holding the wireless device and means for detecting an on-call status and/or an off-call status of the wireless device. The system on a wireless device further includes a processor in the wireless device for configuring settings of the wireless device in response to the user action. The configuring of settings is performed any one of manually and automatically. The settings of the wireless device include at least one of a ring setting, a battery setting, an input pad setting and a device use setting.

31 Claims, 6 Drawing Sheets

WIRELESS DEVICE ALLOWING FOR CONFIGURATION OF SETTINGS AND METHOD THEREFOR

BACKGROUND OF THE INVENTION

1. Field of the Invention

The present invention generally relates to the field of wireless communication systems, and more particularly relates to the configuration of settings on a wireless device.

2. Description of the Related Art

With the advent of messaging devices and mobile telephones the wireless service industry has grown into a multi-billion dollar industry. The Cellular Telecommunications and Internet Association calculates that 120 million Americans own a mobile telephone—about half of the U.S. population. As the development of mobile telephones progresses, many mobile customers are upgrading to pricier phones and phone services that feature a plethora of settings, such as ring settings, battery settings, etc. The numerous number of settings often take considerable time to configure. In addition, settings must often be modified when the mobile telephone is used in different situations, such as in an office or in other locations where ringing is not appropriate. As a result, the management of the multitude of settings on mobile telephones today has become unwieldy.

In addition, accidental entry of information into the input pad of a mobile telephone has increased. As a user brings a mobile telephone to his head to begin speaking, the user's head often touches the input pad of the mobile telephone, prompting the mobile telephone to being entering information. This can cause unnecessary and unwanted entry of information into the mobile telephone or, even worse, accidental erasure of information in the mobile telephone.

SUMMARY OF THE INVENTION

Briefly, in accordance with the present invention, disclosed is a system, method and computer readable medium for configuring settings of a wireless device. In an embodiment of the present invention, the system on a wireless device includes means for detecting a user action indicating a particular mode for the wireless device. The means for detecting includes any one of means for detecting the proximity of a holster for holding the wireless device and means for detecting an on-call status and/or an off-call status of the wireless device. The system on a wireless device further includes a processor in the wireless device for configuring settings of the wireless device in response to the user action. The configuring of settings is performed any one of manually and automatically. The settings of the wireless device include at least one of a ring setting, a battery setting, an input pad setting and a device use setting.

In another embodiment of the present invention, the system on a wireless device includes means for detecting the proximity of a holster for holding the wireless device, wherein if the holster is detected within a proximity threshold, a signal is generated. The wireless device further includes a processor in the wireless device for receiving the signal and for configuring settings of the wireless device. The means for detecting the proximity of the holster includes any one of a semiconductor, a reed switch, a circular conducting element, a switch and optical means. The settings of the wireless device include at least one of a ring setting, a battery setting, an input pad setting and a device use setting.

The configuration of the ring setting is beneficial when the wireless device is in the holster because it allows a user to avoid loud and/or disruptive ringing. When the wireless device is in the holster, there is no need for the device to ring due to the proximity of the wireless device 106 to the user. Thus, the vibration of the wireless device 106 notifies the user of an incoming call.

The configuration of the ring setting is also advantageous because it eliminates the repeated adjustment of the ring setting by a user when he enters into situation when a ring is not appropriate, such as in a movie theater or a place of worship. The configuration of the ring setting is further advantageous because it reduces the number of missed calls due to the removal of a wireless device from a user's person when the wireless device is set to vibrate. Users often miss calls when the wireless device is not attached to the user and it is set to vibrate. A preferred embodiment according to the present invention configures the wireless device to ring when it is removed from the holster, thereby allowing the user to hear the wireless device when it receives an incoming call.

The configuration of the battery setting is beneficial when the wireless device is in the holster because it saves battery life and allows for longer use of the wireless device between charges. When the wireless device is in the holster, there is no need for certain tasks or operations to continue, such as the backlight of the view screen of the wireless device. The present invention configures the battery setting of the wireless device to battery save mode when it is inserted into the holster, thereby saving battery life.

The configuration of the input pad setting is beneficial when the wireless device is in the holster because it eliminates the accidental entry of information via the input pad when the wireless device is not in use. When the wireless device is in the holster, there is no need for allowing the input of information into the wireless device via the input pad. The present invention configures the input pad setting of the wireless device to be disabled when it is inserted into the holster, thereby preventing accidental entry of information.

The configuration of the device use setting is beneficial when the wireless device has been removed from the holster for a set period of time because it prevents the unauthorized use of the wireless device by others. When the wireless device has been removed from the holster for a set period of time without use, the present invention configures the device use setting of the wireless device to be disabled. This security feature prevents the unauthorized use of the wireless device when it has been removed from the holster and is not in the possession of the user.

The configuration of the input pad setting is beneficial when the wireless device is in use because it eliminates the accidental entry of information via the input pad when a user is speaking into the wireless device 106. When the wireless device is in use by a user, there is often no need for allowing the input of information into the wireless device via the input pad. The present invention configures the input pad setting of the wireless device to be disabled when it is in use, thereby preventing accidental entry of information.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, advantageously overcomes problems with the prior art by providing a system, method and computer program product for adjusting configuration settings of a wireless device, as will be discussed in detail below.

I. Overview

Figure 1:
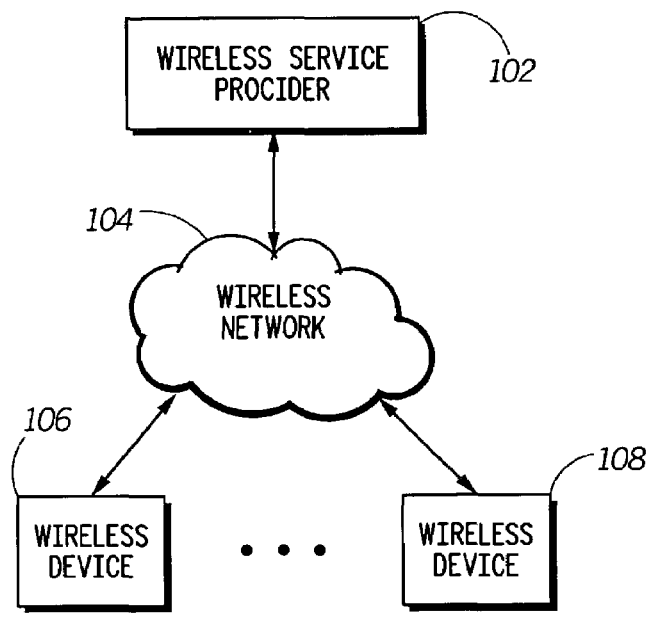
FIG. 1 is a block diagram illustrating a conventional wireless communication system.

FIG. 1 is a block diagram illustrating a conventional wireless communication system. FIG. 1 shows a wireless service provider 102 operating on a wireless network 104, which connects the wireless service provider 102 with wireless devices 106 and 108. The wireless service provider 102 is a first-generation analog mobile phone service, a second-generation digital mobile phone service or a third-generation Internet-capable mobile phone service. The wireless network 104 is a mobile phone network, a mobile text messaging device network, or the like. Further, the communications standard of the wireless network 104 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like. Alternatively, the communications standard of the wireless network 104 of FIG. 1 comprises a short range communications system such as Bluetooth, Infrared Data Association (IrDA) or the like.

The wireless network 104 supports any number of wireless devices 106 through 108, which are mobile telephone phones, smart phones, text messaging devices, two-way messaging devices, handheld computers, messaging devices, beepers, or the like. A smart phone is a combination of 1) a pocket PC, handheld PC, palm top PC, or Personal Digital Assistant (PDA) and 2) a mobile telephone. Wireless devices 106 through 108 are described in further detail below.

Figure 2:
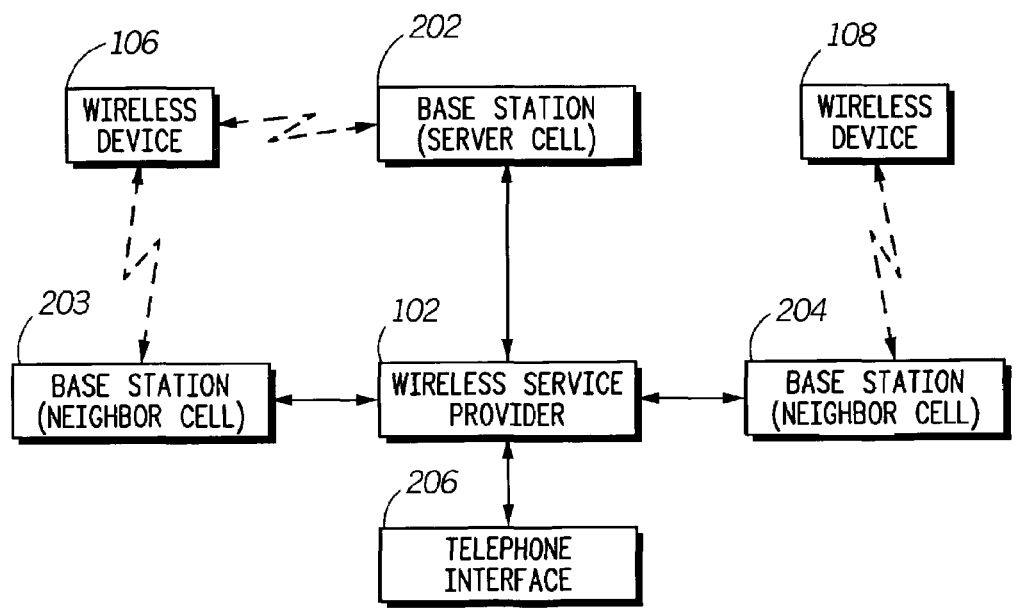
FIG. 2 is a more detailed block diagram of a conventional wireless communication system.

FIG. 2 is a more detailed block diagram of a conventional wireless communication system. FIG. 2 is a more detailed block diagram of the wireless communication system described with reference to FIG. 1 above. The wireless communication system of FIG. 2 includes the wireless service provider 102 coupled to base stations 202, 203, and 204, which represent the wireless network 104 of FIG. 1. The base stations 202, 203, and 204 individually support portions of a geographic coverage area containing subscriber units or transceivers (i.e., wireless devices) 106 and 108 (see FIG. 1). The wireless devices 106 and 108 interface with the base stations 202, 203, and 204 using a communication protocol, such as CDMA, FDMA, CDMA, GPRS and GSM. The wireless service provider 102 is interfaced to an external network (such as the Public Switched Telephone Network) through a telephone interface 206.

The geographic coverage area of the wireless communication system of FIG. 2 is divided into regions or cells, which are individually serviced by the base stations 202, 203, and 204 (also referred to herein as cell servers). A wireless device operating within the wireless communication system selects a particular cell server as its primary interface for receive and transmit operations within the system. For example, wireless device 106 has cell server 202 as its primary cell server, and wireless device 108 has cell server 204 as its primary cell server. Preferably, a wireless device selects a cell server that provides the best communication interface into the wireless communication system. Ordinarily, this will depend on the signal quality of communication signals between a wireless device and a particular cell server.

As a wireless device moves between various geographic locations in the coverage area, a hand-off or hand-over may be necessary to another cell server, which will then function as the primary cell server. A wireless device monitors communication signals from base stations servicing neighboring cells to determine the most appropriate new server for hand-off purposes. Besides monitoring the quality of a transmitted signal from a neighboring cell server, the wireless device also monitors the transmitted color code information associated with the transmitted signal to quickly identify which neighbor cell server is the source of the transmitted signal.

Figure 3:
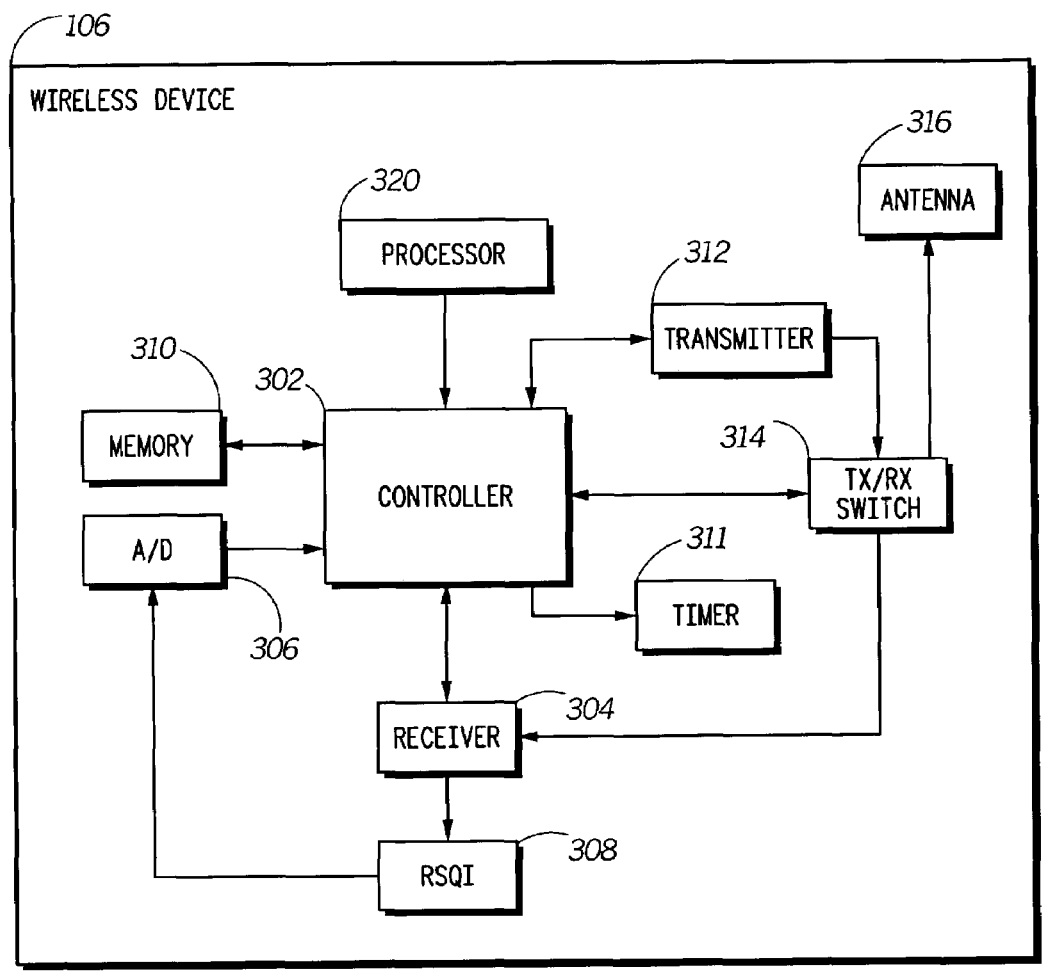
FIG. 3 is a block diagram illustrating a conventional wireless device for a wireless communication system.

FIG. 3 is a block diagram illustrating a conventional wireless device for a wireless communication system. FIG. 3 is a more detailed block diagram of a wireless device described with reference to FIGS. 1 and 2 above. FIG. 3 shows a wireless device 106, such as shown in FIG. 1. In one embodiment of the present invention, the wireless device 106 is a two-way radio capable of receiving and transmitting radio frequency signals over a communication channel under a communications protocol such as CDMA, FDMA, CDMA, GPRS or GSM. The wireless device 106 operates under the control of a controller 302 which switches the wireless device 106 between receive and transmit modes. In receive mode, the controller 302 couples an antenna 316 through a transmit/receive switch 314 to a receiver 304. The receiver 304 decodes the received signals and provides those decoded signals to the controller 302. In transmit mode, the controller 302 couples the antenna 316, through the switch 314, to a transmitter 312.

The controller 302 operates the transmitter and receiver according to instructions stored in memory 310. The stored instructions include a neighbor cell measurement scheduling algorithm. Memory 310 is Flash memory, other non-volatile memory, random access memory (RAM), dynamic random access memory (DRAM) or the like. A timer module 311 provides timing information to the controller 302 to keep track of timed events. Further, the controller 302 can utilize the time information from the timer module 311 to keep track of scheduling for neighbor cell server transmissions and transmitted color code information.

When a neighbor cell measurement is scheduled, the receiver 304, under the control of the controller 302, monitors neighbor cell servers and receives a "received signal quality indicator" (RSQI). RSQI circuit 308 generates RSQI signals representing the signal quality of the signals transmitted by each monitored cell server. Each RSQI signal is converted to digital information by an analog-to-digital converter 306 and provided as input to the controller 302. Using the color code information and the associated received signal quality indicator, the wireless device 106 determines the most appropriate neighbor cell server to use as a primary cell server when hand-off is necessary.

Processor 320 in FIG. 3 performs various functions such as the functions attributed to configuration setting adjustment, described in greater detail below. In various embodiments of the present invention, the processor 320 in FIG. 3 is a single processor or more than one processor for performing the tasks described above.

In an embodiment of the present invention, the wireless device 106 is further a smart phone, which is a combination of 1) a pocket PC, handheld PC, palm top PC, or Personal Digital Assistant (PDA) and 2) a mobile telephone. In this embodiment, the wireless device 106 includes more than one processor 320—a baseband processor and an application processor. The baseband processor handles those processes associated with the call setup and call maintenance processes of the wireless device 106. The application processor 304 handles those processes associated with the execution of application programs on the PC portion of the wireless device 106. The baseband processor and the application processor have access to the memory module 310, which is used for storing and retrieving data and instructions necessary for performing the functions of wireless device 106.

II. Wireless Device Hardware

A. The Wireless Device

Figure 4:
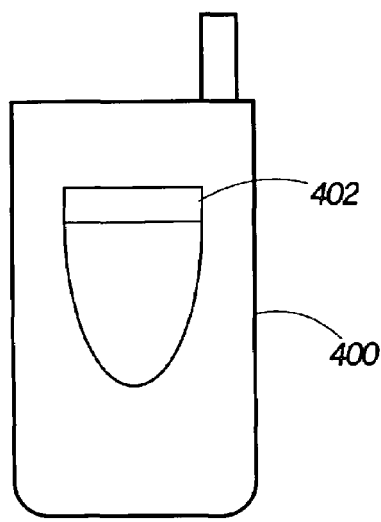
FIG. 4 is an illustration of a front side view of an exemplary wireless device.

FIG. 4 is an illustration of a front side view of an exemplary wireless device 400. In an embodiment of the present invention, the wireless device 106 is an exemplary wireless device 400 as shown in FIG. 4. The exemplary wireless device 400 encompasses the conventional functions of a cellular telephone, including initiating and receiving telephone calls, voice mail, contact information storage, call data storage and initiating and receiving text communications. In one alternative, the exemplary wireless device 400 encompasses the conventional functions of an Integrated Digital Enhanced Network (iDEN) cellular telephone. An iDEN cellular telephone integrates two-way radio, telephone, text messaging and data transmission into a single network. In another alternative, the exemplary wireless device 400 encompasses the conventional functions of a smart phone. A smart phone is a combination of 1) a pocket PC, handheld PC, palm top PC, or PDA and 2) a mobile telephone.

Figure 5:
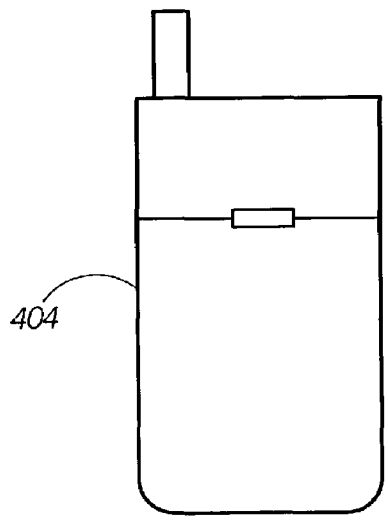
FIG. 5 is an illustration of a back side view of an exemplary wireless device.
Figure 6:
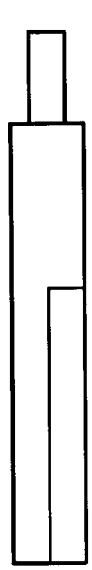
FIG. 6 is an illustration of a side view of an exemplary wireless device.

The exemplary wireless device 400 of FIG. 4 is a flip phone. That is, the exemplary wireless device 400 comprises two planar elements coupled by a hinge. When the exemplary wireless device 400 is not in use, the two planar elements are closed (as shown in FIGS. 4, 5 and 6). When in the closed state, the exemplary wireless device 400 can be placed into a holster for holding the exemplary wireless device 400 (the holster is described in greater detail below). When the exemplary wireless device 400 is in use, the two planar elements are opened (not shown in the figures), exposing such elements as a touch pad, viewing screen, microphone and/or speaker. Also shown in FIG. 4 is a small display 402 for displaying such data as the time, call status and automatic caller identification for incoming calls.

FIG. 5 is an illustration of a back side view of the exemplary wireless device 400. FIG. 5 shows that the back side of the exemplary wireless device 400 includes a battery 404. The battery 404 is detachably coupled to the exemplary wireless device 400 using a clip or other coupling device. FIG. 6 is an illustration of a side view of the exemplary wireless device 400.

B. The Holster

A holster is a cradle or other support device for holding the exemplary wireless device 400 and for attaching to another body, such as the clothes of an individual. For example, a holster is a plastic cradle that holds the exemplary wireless device 400 and includes a belt clip for attaching to a belt or other object that is worn or carried by a user of the exemplary wireless device 400.

Figure 7:
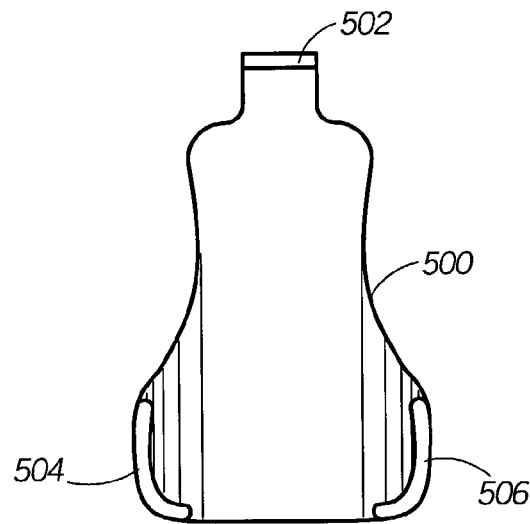
FIG. 7 is an illustration of a front side view of a holster.

FIG. 7 is an illustration of a front side view of a holster 500. In an embodiment of the present invention, the holster 500 is a device manufactured from a pliable material such as plastic. FIG. 7 shows that the holster 500 includes a hooked surface 502 at the top of the holster 500. The hooked surface 502 curves around the top of the exemplary wireless device 400, when it is placed in the holster 500, and serves to hold the top of the exemplary wireless device 400 within the holster 500. FIG. 7 also shows that the holster 500 includes a hooked surface 504 on the left side of the holster 500 and a hooked surface 506 on the right side of the holster 500. The hooked surface 504 curves around the left side of the exemplary wireless device 400, when it is placed in the holster 500, and serves to hold the left side of the exemplary wireless device 400 within the holster 500. The hooked surface 506 curves around the right side of the exemplary wireless device 400, when it is placed in the holster 500, and serves to hold the right side of the exemplary wireless device 400 within the holster 500. The placement of the exemplary wireless device 400 within holster 500 is described in greater detail below.

Figure 8:
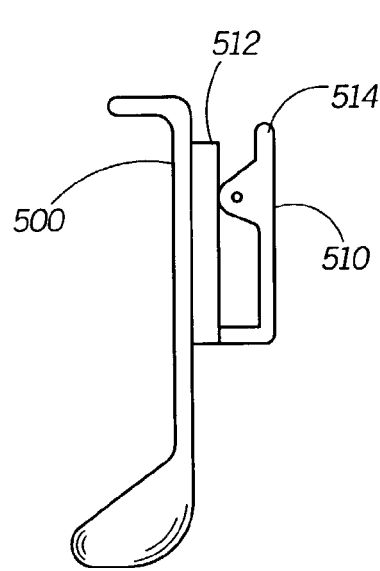
FIG. 8 is an illustration of a side view of a holster.

FIG. 8 is an illustration of a side view of the holster 500. FIG. 8 shows that the holster 500 includes a clip 510 for clipping the holster 500 to an object such as a belt, a pant end or any other flat surface. The clip 510 is coupled to the holster 500 via a hinge that allows the clip 510 to be opened and closed for attachment purposes. The hinge 512 of the clip 510 for coupling the clip 510 to a clip element 514. The clip element 514 remains stationary as the clip 510 is allowed to open and close via the hinge 512.

Figure 9:
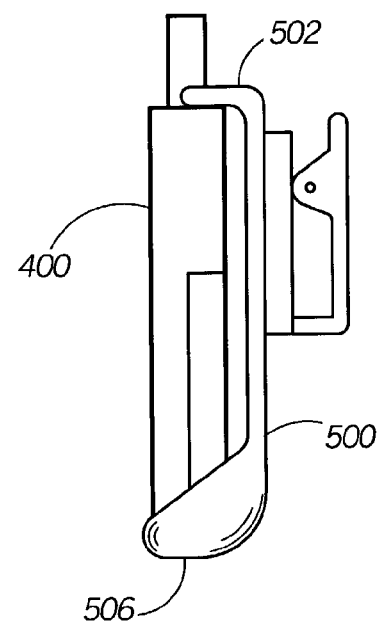
FIG. 9 is an illustration of a side view of an exemplary wireless device coupled with a holster.

FIG. 9 is an illustration of a side view of the exemplary wireless device 400 coupled with the holster 500. FIG. 9 shows that the exemplary wireless device 400 is placed within the holster 500 with the back side of the exemplary wireless device 400 facing the front face of the holster 500, and the front side of the exemplary wireless device 400 facing away from the front face of the holster 500.

FIG. 9 also shows that the hooked surface 502 curves around the top of the exemplary wireless device 400 and serves to hold the top of the exemplary wireless device 400 within the holster 500. FIG. 9 also shows that the hooked surface 506 curves around the right side of the exemplary wireless device 400 and serves to hold the right side of the exemplary wireless device 400 within the holster 500. The hooked surface 504 (not shown) curves around the left side of the exemplary wireless device 400 and serves to hold the left side of the exemplary wireless device 400 within the holster 500.

C. The Hall Effect

In an embodiment of the present inventions the exemplary wireless device 400 detects the placement of the exemplary wireless device 400 into the holster 500 by means of a detector in the exemplary wireless device 400. The detector works in conjunction with a magnet that is connected or integrated with the holster 500. When the exemplary wireless device 400 is placed into the holster 500, the detector detects the proximity of the magnet in the holster 500.

In an embodiment of the present invention, the magnet used in the holster 500 is a small (a few millimeters in length and width) ferrous metal that exhibits a magnetic field of about 0.1 Tesla. The magnet may be integrally formed with the holster 500 or detachably coupled to the outside of the holster 500. FIG. 8 shows exemplary locations 520, 522 and 524 for the magnet in the holster 500. FIG. 5 shows corresponding exemplary locations 420, 422 and 424 for the detector in the exemplary wireless device 400. The detector may be integrally formed with the exemplary wireless device 400 or detachably coupled to the outside of the exemplary wireless device 400.

Figure 10:
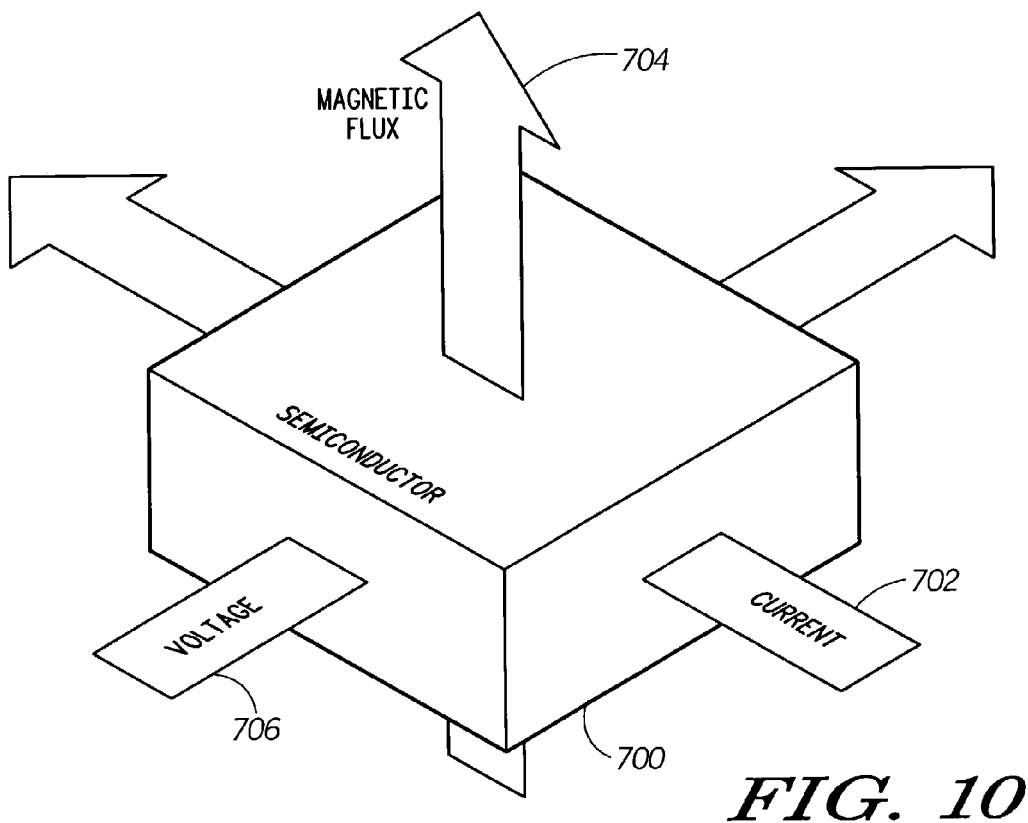
FIG. 10 is an illustration of a semiconductor for use in a Hall effect sensor.

In an embodiment of the present invention, the detector used in the holster is any detector useful for detecting a magnet field, such as a reed switch, a Hall effect sensor or a circular conducting element. A Hall effect sensor, for example, utilizes a semiconductor to sense a proximal magnetic field. FIG. 10 is an illustration of a semiconductor 700 for use in a Hall effect sensor. When an electric current 702 flows through the semiconductor 700 in a magnetic field (exhibiting magnetic flux line 704), the magnetic field exerts a transverse force on the moving charge carriers, the force tending to push the charge carriers to one side of the semiconductor 700. This is most evident in a thin flat semiconductor 700, as illustrated. A buildup of charge at the sides of the semiconductor 700 will balance this magnetic influence, producing a measurable voltage between the two sides of the semiconductor 700. The presence of this measurable transverse voltage 706 is called the Hall effect after E. H. Hall, who discovered it in 1879.

The function of a Hall effect sensor is based on the physical principle of the Hall effect. A Hall effect sensor measures voltage 706 generated transversely to the current flow direction 702 in the semiconductor 700, if a magnetic field 704 is applied perpendicularly to the semiconductor 700. As the Hall effect is most pronounced in semiconductors, the most suitable Hall element is a small platelet made of semiconductive material (i.e., the semiconductor 700). The Hall effect sensor detects the components of the magnetic flux 704 perpendicular to the surface of the semiconductor 700 and emits a proportional electrical signal, which is processed in the exemplary wireless device 400. Thus, as the magnet in the holster 500 is placed within a proximity of the detector in the exemplary wireless device 400, the detector in the exemplary wireless device 400 detects the presence of the magnet in the holster 500 near the exemplary wireless device 400.

D. Other Detection Means

In another embodiment of the present invention, the exemplary wireless device 400 detects the placement of the exemplary wireless device 400 into the holster 500 by means of a button or switch in the exemplary wireless device 400. The button or switch is connected or integrated with the exemplary wireless device 400. When the exemplary wireless device 400 is placed into the holster 500, the button or switch opens or closes a circuit that indicates the placement of the exemplary wireless device 400 into the holster 500.

The button or switch used in the exemplary wireless device 400 is a small (a few millimeters in length and width) button or switch that opens or closes a circuit in the exemplary wireless device 400. The button or switch may be integrally formed with the exemplary wireless device 400 or detachably coupled to the outside of the exemplary wireless device 400. The button or switch is activated by the holster 500 (or a notch or other protrusion in the holster 500) when the exemplary wireless device 400 is placed into the holster 500.

FIG. 5 shows exemplary locations 420, 422 and 424 for the button or switch in the exemplary wireless device 400. FIG. 8 shows corresponding exemplary locations 520, 522 and 524 for the notch or protrusion in the holster 500. The notch or protrusion may be integrally formed with the holster 500 or detachably coupled to the outside of the holster 500.

In another embodiment of the present invention, the exemplary wireless device 400 detects the placement of the exemplary wireless device 400 into the holster 500 by optical means in the exemplary wireless device 400. That is, an optical signal in the exemplary wireless device 400 is broken when the exemplary wireless device 400 is placed into the holster 500. The optical means are connected or integrated with the exemplary wireless device 400. When the exemplary wireless device 400 is placed into the holster 500, an optical signal in the exemplary wireless device 400 is broken, indicating the placement of the exemplary wireless device 400 into the holster 500.

III. Configuration of Settings

Figure 11:
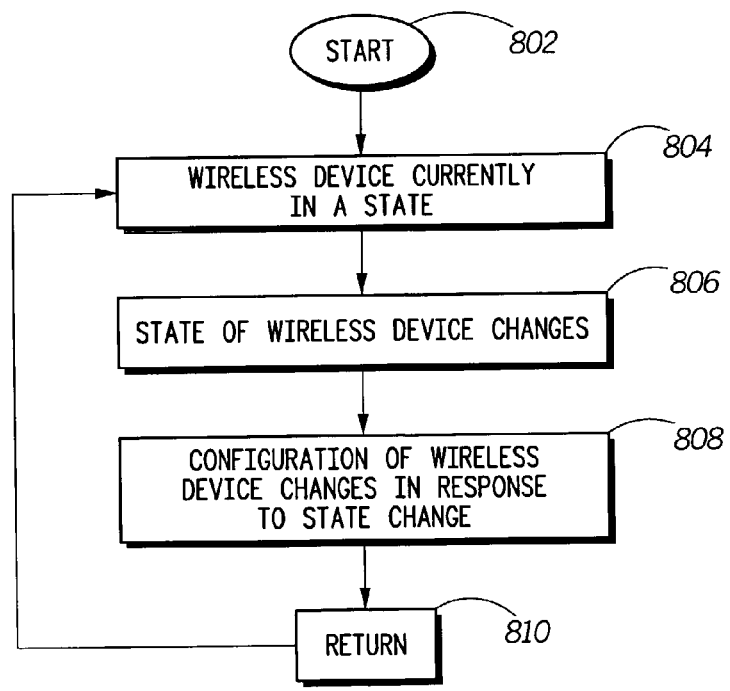
FIG. 11 is an operational flow diagram showing a configuration setting process of a wireless device according to a preferred embodiment of the present invention.

As described above, the present invention allows for the configuration of settings of the wireless device 106 based on the state of the wireless device 106. FIG. 11 is an operational flow diagram showing a configuration setting process of a wireless device according to a preferred embodiment of the present invention. The operational flow diagram of FIG. 11 depicts the process, on a wireless device 106, of adjusting the configuration settings of wireless device 106 based on the state of the wireless device 106. The operational flow diagram of FIG. 11 begins with step 802 and flows directly to step 804.

In step 804, the wireless device 106 is currently in a state, such as idle or on-call. The on-call state of the wireless device 106 indicates that the user is currently engaged in a telephone call. The idle state of the wireless device 106 indicates that the user is not currently engaged in a telephone call. In step 806, the state of the wireless device 106 changes. For example, if the wireless device 106 was in an idle state in step 804, then the wireless device 106 initiates a telephone call in step 806 and enters the on-call state. In another example, if the wireless device 106 was in an on-call state in step 804, then the wireless device 106 ends the telephone call in step 806 and proceeds to be in the idle state.

In step 808, the settings of the wireless device 106 are adjusted in response to the change in state of step 806. In step 810, the control of FIG. 11 returns to step 804. Settings include a variety of settings associated with the functions of the wireless device 106. One example of a setting of the wireless device 106 is the ring setting. The wireless device 106 can be configured such that the wireless device 106 performs a variety of actions when an incoming call is detected. The wireless device 106 can be configured such that the wireless device 106 plays a ring, a series of rings, a beep, a series of beeps or any audio file (such as WAV file or an MP3 file) when an incoming call is detected. The wireless device 106 can also be configured such that the wireless device 106 vibrates when an incoming call is detected.

Another example of a setting of the wireless device 106 is the battery setting. The wireless device 106 can be configured such that the wireless device 106 operates in different battery modes, such as normal battery mode and battery save mode, in different situations. In battery save mode, the wireless device 106 is configured such that the wireless device 106 performs battery save tasks such as turning off the backlight of the view screen of the wireless device 106 or powering down certain electrical components of the wireless device 106. In normal battery mode, the wireless device 106 is configured such that the wireless device 106 operates normally without attempting to save battery power.

Another example of a setting of the wireless device 106 is the input pad setting. The wireless device 106 can be configured such that the input pad of the wireless device 106 is either enabled or disabled. When the input pad of the wireless device 106 is enabled, the wireless device 106 is configured such that information can be entered into the wireless device 106 via the input pad. When the input pad of the wireless device 106 is disabled, the wireless device 106 is configured such that information can no longer be entered into the wireless device 106 via the input pad.

Another example of a setting of the wireless device 106 is the device use setting. The wireless device 106 can be configured such that use of the wireless device 106 is either enabled or disabled. Typically, the use of the wireless device 106 is disabled only after the wireless device 106 has been idle for a set period of time. When the use of the wireless device 106 is enabled, the wireless device 106 is configured such that the wireless device 106 can be used normally. When the use of the wireless device 106 is disabled or locked, the wireless device 106 is configured such that the wireless device 106 cannot be used for any function.

In an embodiment of the present invention, the operational flow diagram of FIG. 11 depicts the process, on a wireless device 106, of configuring settings of wireless device 106 based on the placement (or non-placement of) of the wireless device 106 within a holster, such as holster 500. FIG. 11 is described below with reference to the above embodiment. The operational flow diagram of FIG. 11 begins with step 802 and flows directly to step 804.

In step 804, the wireless device 106 is currently in a state, such as the in-holster state and the out-of-holster state. In step 806, the state of the wireless device 106 changes. That is, the wireless device 106 is either removed from the holster 500 or inserted into the holster 500. In step 808, the configuration settings of the wireless device 106 are adjusted in response to the change in state of step 806. Settings include a variety of settings associated with the functions of the wireless device 106. Settings are described in greater detail above.

In an embodiment of the present invention, in step 808, a group of settings are adjusted to a first sequence if the wireless device 106 is placed in the holster 500 in step 806. The following section describes the first sequence of settings.

First, the ring setting of the wireless device 106 is set to vibrate if the wireless device 106 is not externally powered. That is, the wireless device 106 does not ring when an incoming telephone call is detected. Rather, the wireless device 106 vibrates to notify the user that an incoming call is detected. This setting is only adjusted if the wireless device 106 is not externally powered, i.e., when the wireless device 106 is not connected to a charger or other device for providing an electrical current to the wireless device 106.

Second, the battery setting of the wireless device 106 is set to battery save mode. This setting enables the wireless device 106 to perform battery save tasks such as turning off the backlight of the view screen of the wireless device 106 or powering down certain electrical components of the wireless device 106. Third, the input pad of the wireless device 106 is locked or disabled. This setting disables the input pad such that information can no longer be entered into the input pad. Fourth, the device use setting of the wireless device 106 is enabled. That is, the wireless device 106 is currently able to be utilized by the user in a normal fashion.

In an embodiment of the present invention, in step 808, a group of settings are adjusted to a second sequence if the wireless device 106 is removed from the holster 500 in step 806. The following section describes the second sequence of settings.

First, the ring setting of the wireless device 106 is set to ring. That is, the wireless device 106 rings when an incoming telephone call is detected. Second, the battery setting of the wireless device 106 is set to normal mode. This setting allows the wireless device 106 to perform tasks normally without having to perform battery save tasks such as turning off the backlight of the view screen of the wireless device 106 or powering down certain electrical components of the wireless device 106.

Third, the input pad of the wireless device 106 is unlocked or enabled. This setting enables the input pad such that information can be entered into the input pad. Fourth, the device use setting of the wireless device 106 is set to be disabled after a time period. That is, after the wireless device 106 has been removed from the holster 500 for a set period of time, the wireless device 106 is disabled such that it can no longer be used for any functions. The wireless device 106 can be removed from the disabled device use setting if the user inserts the wireless device 106 into the holster 500 or inputs a code or password into the input pad of the wireless device 106.

In step 810, the control of FIG. 11 returns to step 804.

The configuration of the ring setting is beneficial when the wireless device 106 is in the holster 500 because it allows a user to avoid loud and/or disruptive ringing. When the wireless device 106 is in the holster 500, there is no need for the device to ring due to the proximity of the wireless device 106 to the user. Thus, the vibration of the wireless device 106 notifies the user of an incoming call.

The configuration of the ring setting is also advantageous because it eliminates the repeated adjustment of the ring setting by a user when he enters into situation when a ring is not appropriate, such as in a movie theater or a place of worship. The configuration of the ring setting is further advantageous because it reduces the number of missed calls due to the removal of a wireless device 106 from a user's person when the wireless device 106 is set to vibrate. Users often miss calls when the wireless device 106 is not attached to a user and the wireless device 106 is set to vibrate. The present invention configures the wireless device 106 to ring when it is removed from the holster 500, thereby allowing the user to hear the wireless device 106 when it receives an incoming call.

The configuration of the battery setting is beneficial when the wireless device 106 is in the holster 500 because it saves battery life and allows for longer use of the wireless device 106 between charges. When the wireless device 106 is in the holster 500, there is no need for certain tasks or operations to continue, such as the backlight of the view screen of the wireless device 106. The present invention configures the battery setting of the wireless device 106 to battery save mode when it is inserted into the holster 500, thereby saving battery life.

The configuration of the input pad setting is beneficial when the wireless device 106 is in the holster 500 because it eliminates the accidental entry of information via the input pad when the wireless device 106 is not in use. When the wireless device 106 is in the holster 500, there is no need for allowing the input of information into the wireless device 106 via the input pad. The present invention configures the input pad setting of the wireless device 106 to be disabled when it is inserted into the holster 500, thereby preventing accidental entry of information.

The configuration of the device use setting is beneficial when the wireless device 106 has been removed from the holster 500 for a set period of time because it prevents the unauthorized use of the wireless device 106 by others. When the wireless device 106 has been removed from the holster 500 for a set period of time without use, the present invention configures the device use setting of the wireless device 106 to be disabled. This security feature prevents the unauthorized use of the wireless device 106 when it has been removed from the holster 500 and is not in the possession of the user.

Figure 12:
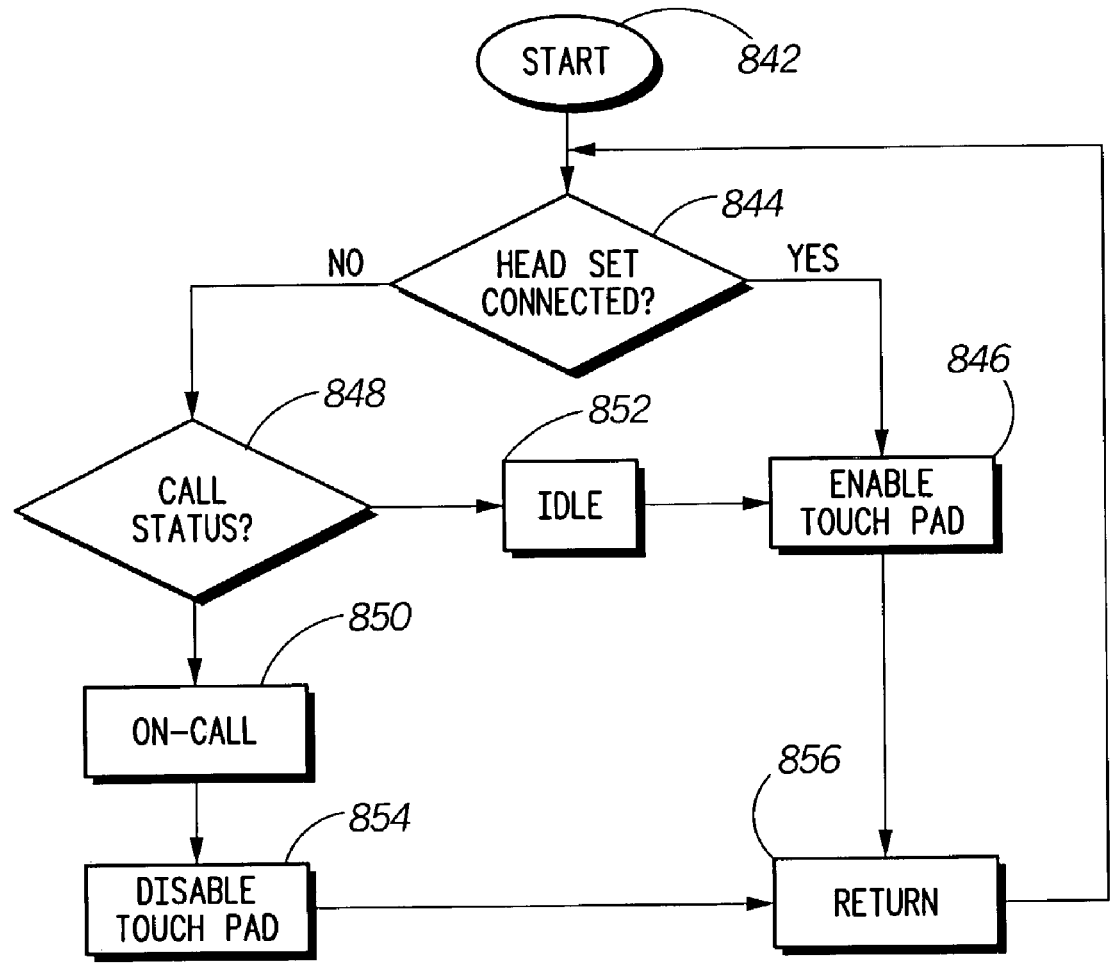
FIG. 12 is an operational flow diagram showing another configuration setting process of a wireless device according to a preferred embodiment of the present invention.

FIG. 12 is an operational flow diagram showing another configuration setting process of the wireless device 106 according to a preferred embodiment of the present invention. The operational flow diagram of FIG. 12 depicts the process, on a wireless device 106, of configuring settings of wireless device 106 based on the call status of the wireless device 106. The operational flow diagram of FIG. 12 begins with step 842 and flows directly to step 844.

In optional step 844, it is determined whether there is a headset connected to the wireless device 106. A headset typically comprises one or two small speakers that fit into one or both ears of a user, a small microphone for receiving audio from the user and a jack for inserting a wire connecting the speakers and microphone to the wireless device 106. A headset is typically used in conjunction with a wireless device 106 in order to facilitate speaking into a wireless device 106. The use of a headset eliminates the need for holding the wireless device 106 to a user's head and also allows the hands-free use of the wireless device 106. If the result of the determination of step 844 is positive, the control flows to step 846. If the result of the determination of step 844 is negative, the control flows to step 848.

In step 846, the input pad setting of the wireless device 106 is adjusted in response to the result of the determination of step 844. Namely, the input pad configuration setting of the wireless device 106 is adjusted to be enabled or unlocked. I.e., the input pad is configured to allow for the input of information. In step 856, control flows back to step 844.

In step 848, the call status of the wireless device 106 is determined. In step 848, the wireless device 106 is currently in a call state, such as on-call or idle. The on-call call status of the wireless device 106 indicates that the user is currently engaged in a telephone call. The idle call status of the wireless device 106 indicates that the user is not currently engaged in a telephone call. If the result of the determination of step 848 is the on-call call status, the control flows to step 850. If the result of the determination of step 848 is the idle status, the control flows to step 852.

In step 850, it is determined that the call status of the wireless device 106 is on-call. In step 854, the input pad setting of the wireless device 106 is adjusted in response to the result of the determination of step 848. Namely, the input pad setting of the wireless device 106 is adjusted to be locked or disabled. I.e., the input pad is configured such that the input of information is no longer allowed via the input pad. The input pad setting of the wireless device 106 can be enabled if the user inputs a code or password into the input pad of the wireless device 106. In step 856, control flows back to step 844.

The configuration of the input pad setting is beneficial when the wireless device 106 is in use because it eliminates the accidental entry of information via the input pad when a user is speaking into the wireless device 106. When the wireless device 106 is in use by a user, there is often no need for allowing the input of information into the wireless device 106 via the input pad. The present invention configures the input pad setting of the wireless device 106 to be disabled when it is in use, thereby preventing accidental entry of information.

Note that in one embodiment step 844 is optional. If step 844 is not executed, then controls flows from step 842 directly to step 848.

IV. Exemplary Implementations

The present invention can be realized in hardware, software, or a combination of hardware and software in wireless device 106 of FIG. 1. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product (in wireless device 106), which comprises all the features enabling the implementation of the methods described herein, and which, when loaded in a computer system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Figure 13:
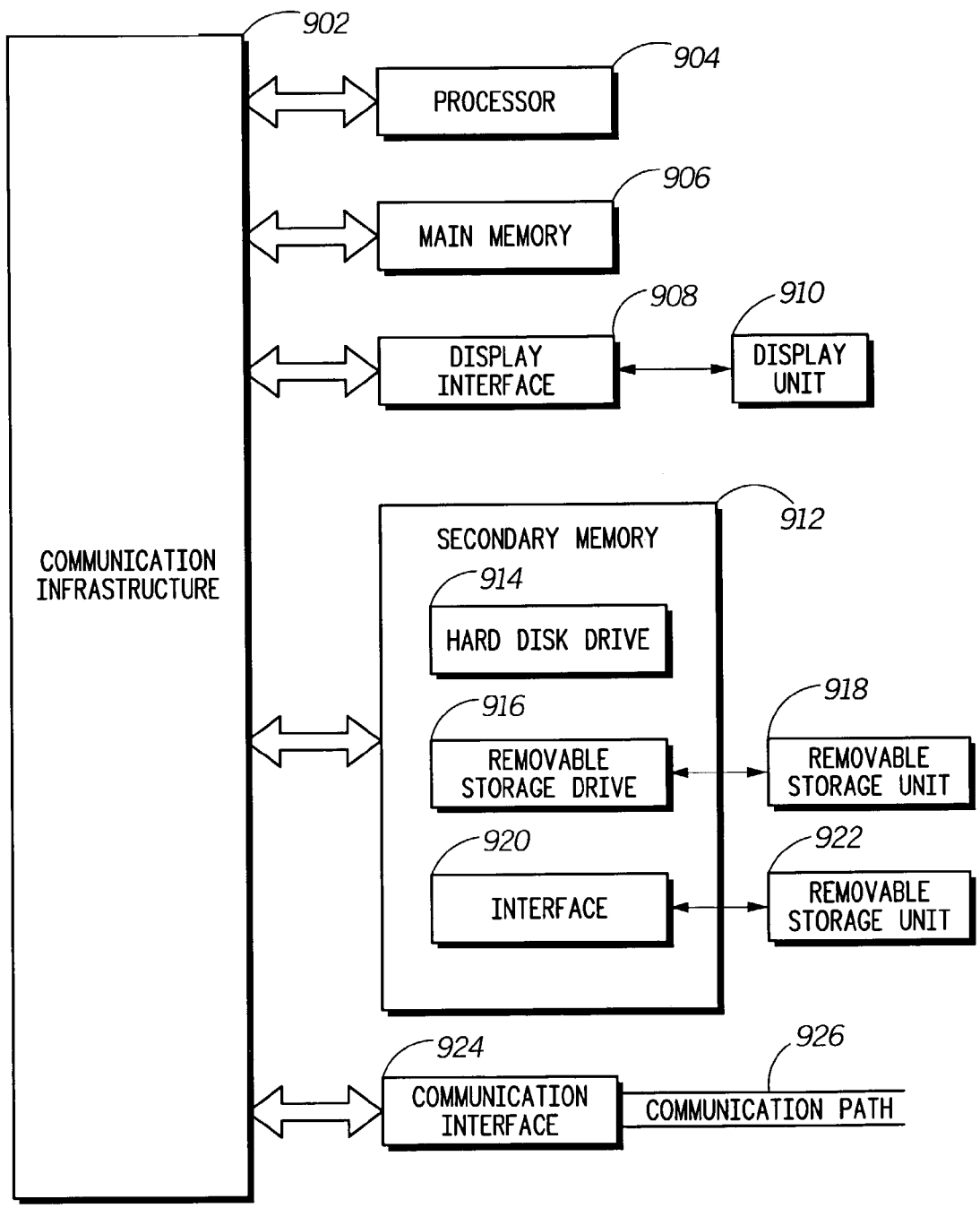
FIG. 13 is a block diagram of an information processing system useful for implementing a preferred embodiment of the present invention.

FIG. 13 is a block diagram of a computer system useful for implementing an embodiment of the present invention. The computer system of FIG. 13 is a more detailed representation of one facet of a wireless device 106. The computer system of FIG. 13 includes one or more processors, such as processor 904. The processor 904 is connected to a communication infrastructure 902 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 908 that forwards graphics, text, and other data from the communication infrastructure 902 (or from a frame buffer not shown) for display on the display unit 910. The computer system also includes a main memory 906, preferably random access memory (RAM), and may also include a secondary memory 912. The secondary memory 912 may include, for example, a hard disk drive 914 and/or a removable storage drive 916, representing a floppy disk drive, a magnetic tape drive, an optical disk drive, etc. The removable storage drive 916 reads from and/or writes to a removable storage unit 918 in a manner well known to those having ordinary skill in the art. Removable storage unit 918, represents a floppy disk, magnetic tape, optical disk, etc., which is read by and written to by removable storage drive 916. As will be appreciated, the removable storage unit 918 includes a computer usable storage medium having stored therein computer software and/or data.

In alternative embodiments, the secondary memory 912 may include other similar means for allowing computer programs or other instructions to be loaded into the computer system. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to the computer system.

The computer system may also include a communications interface 924. Communications interface 924 allows software and data to be transferred between the computer system and external devices. Examples of communications interface 924 may include a modem, a network interface (such as an Ethernet card), a communications port, a PCM-CIA slot and card, etc. Software and data transferred via communications interface 924 are in the form of signals which may be, for example, electronic, electromagnetic, optical, or other signals capable of being received by communications interface 924. These signals are provided to communications interface 924 via a communications path (i.e., channel) 926. This channel 926 carries signals and may be implemented using wire or cable, fiber optics, a phone line, a cellular phone link, an RF link, and/or other communications channels.

In this document, the terms "computer program medium," "computer-usable medium," "machine-readable medium" and "computer-readable medium" are used to generally refer to media such as main memory 906 and secondary memory 912, removable storage drive 916, a hard disk installed in hard disk drive 914, and signals. These computer program products are means for providing software to the computer system. The computer-readable medium allows the computer system to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Computer programs (also called computer control logic) are stored in main memory 906 and/or secondary memory 912. Computer programs may also be received via communications interface 924. Such computer programs, when executed, enable the computer system to perform the features of the present invention as discussed herein. In particular, the computer programs, when executed, enable the processor 904 to perform the features of the computer system. Accordingly, such computer programs represent controllers of the computer system.

V. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A wireless device, comprising:
means for detecting a user action indicating a particular mode for a wireless device, comprising indicating at least one of the following:

a proximity of the wireless device to a user via a holster that attaches the wireless device to the user;
an on-call status for the wireless device; and
an off-call status for the wireless device; and
a processor in the wireless device, communicatively coupled to the means for detecting, for one of enabling and disabling settings of the wireless device in response to the detected user action.

2. The wireless device of claim 1, wherein the means for detecting includes any one of:
means for detecting the proximity of the wireless device to the holster, the holster for attaching the wireless device to the user; and
means for detecting user input indicating the on-call status and/or off-call status for the wireless device.

3. The wireless device of claim 1, wherein the one of enabling and disabling of settings is performed any one of manually and automatically.

4. The wireless device of claim 1, wherein the settings of the wireless device include at least one of:
a ring setting;
a battery setting;
an input pad setting; and
a device use setting.

5. A wireless device allowing for enabling or disabling of settings, comprising:
means for detecting the proximity of a holster for holding the wireless device, wherein if the holster is detected within a proximity threshold, a signal is generated; and
a processor in the wireless device that receives the signal and performs one of enabling and disabling one of a display functionality and a keypad functionality of the wireless device.

6. The wireless device of claim 5, wherein the means for detecting the proximity of the holster comprises any one of:
a semiconductor;
a reed switch;
a circular conducting element;
a switch; and
optical means.

7. The wireless device of claim 6, wherein the means for detecting further comprises detecting any one of:
a protrusion integrally formed with the holster; and
a protrusion detachably coupled to the outside of the holster.

8. The wireless device of claim 7, wherein the means for detecting is any one of:
positioned within the wireless device;
detachably coupled to the outside of the wireless device; and
coupled to any one of the following elements of the wireless device:
a removable battery of the wireless device;
an access panel for a battery of the wireless device; and
a removable element of the wireless device.

9. The wireless device of claim 8, wherein the proximity threshold is less than about one inch.

10. The wireless device of claim 8, wherein the settings include at least one of:
a ring setting;
a battery setting;
an input pad setting; and
a device use setting.

11. A method for configuring settings of a wireless device, comprising:
detecting, by a circuit in the wireless device, the proximity of a magnet coupled to a holster for holding the wireless device; and
enabling or disabling, by a processor in the wireless device, at least one of:
a display function;
an alert function; and
a keypad function of the wireless device.

12. The method of claim 11, wherein the detecting is performed by a means for detecting the proximity of the holster, the means comprising any one of:
a semiconductor;
a reed switch;
a circular conducting element;
a switch; and
optical means.

13. The method of claim 12, wherein the means for detecting further comprises detecting any one of:
a protrusion integrally formed with the holster; and
a protrusion detachably coupled to the outside of the holster.

14. The method of claim 13, wherein the means for detecting is any one of:
positioned within the wireless device;
detachably coupled to the outside of the wireless device; and
coupled to any one of the following elements of the wireless device:
a removable battery of the wireless device;
an access panel for a battery of the wireless device; and
a removable element of the wireless device.

15. The method of claim 14, wherein the proximity threshold is less than about one inch.

16. The method of claim 14, wherein the settings include at least one of:
a ring setting;
a battery setting;
an input pad setting; and
a device use setting.

17. A wireless device allowing for configuration of settings, comprising:
a processor for configuration of settings, wherein when the processor detects an on-call status of the wireless device, the processor configures an input pad setting of the wireless device such that the input pad is disabled and wherein when the processor detects an off-call status of the wireless device, the processor configures the input pad setting of the wireless device such that the input pad is enabled.

18. The wireless device of claim 17, wherein the processor detects an on-call status of the wireless device by detecting a signal for an incoming call, and detecting a command from a user of the wireless device for answering the incoming call.

19. The wireless device of claim 18, wherein the processor further detects an on-call status of the wireless device by detecting a command from a user of the wireless device for initiating a call.

20. The wireless device of claim 19, wherein the processor further detects a command from the user for enabling the input pad and configures the input pad setting of the wireless device such that the input pad is enabled.

21. The wireless device of claim 19, wherein the processor detects an off-call status of the wireless device by detecting a command from a user of the wireless device for canceling a call, detecting a dropped call and detecting a signal for canceling a call.

22. A wireless device allowing for configuration of settings, comprising:
    a processor for configuration of settings,
    wherein when the processor detects an on-call status of the wireless device, the processor determines if a headset is coupled to the wireless device and if a headset is not coupled to the wireless device, the processor configures an input pad setting of the wireless device such that the input pad is disabled, and
    wherein when the processor detects an off-call status of the wireless device, the processor determines if the input pad setting of the wireless device is disabled and if the input pad setting of the wireless device is disabled, the processor configures the input pad setting of the wireless device such that the input pad is enabled.

23. The wireless device of claim 22, wherein the processor detects an on-call status of the wireless device by detecting a signal for an incoming call, and detecting a command from a user of the wireless device for answering the incoming call.

24. The wireless device of claim 23, wherein the processor further detects an on-call status of the wireless device by detecting a command from a user of the wireless device for initiating a call.

25. The wireless device of claim 24, wherein the processor further detects a command from the user for enabling the input pad and configures the input pad setting of the wireless device such that the input pad is enabled.

26. The wireless device of claim 24, wherein the processor detects an off-call status of the wireless device by detecting a command from a user of the wireless device for canceling a call, detecting a dropped call and detecting a signal for canceling a call.

27. A computer readable medium including computer instructions for configuring settings of a wireless device, the computer instructions including instructions for:
    detecting an on-call status of the wireless device and configuring an input pad setting of the wireless device such that the input pad is disabled; and
    detecting an off-call status of the wireless device and configuring the input pad setting of the wireless device such that the input pad is enabled.

28. The computer readable medium of claim 27, wherein the instructions for detecting the on-call status include instructions for:
    detecting a signal for an incoming call; and
    detecting a command from a user of the wireless device for answering the incoming call.

29. The computer readable medium of claim 28, wherein the instructions for detecting an on-call status further includes instructions for:
    detecting a command from a user of the wireless device for initiating a call.

30. The computer readable medium of claim 29, further comprising instructions for:
    detecting a command from the user for enabling the input pad; and
    configuring the input pad setting of the wireless device such that the input pad is enabled.

31. The computer readable medium of claim 29, wherein the instructions for detecting an off call status comprise instructions for any one of:
    detecting a command from a user of the wireless device for canceling a call;
    detecting a dropped call; and
detecting a signal for canceling a call.

\* \* \* \* \*